Oct. 1, 1929.  E. WILDHABER  1,730,183
DIFFERENTIAL GEAR
Filed Feb. 7, 1928
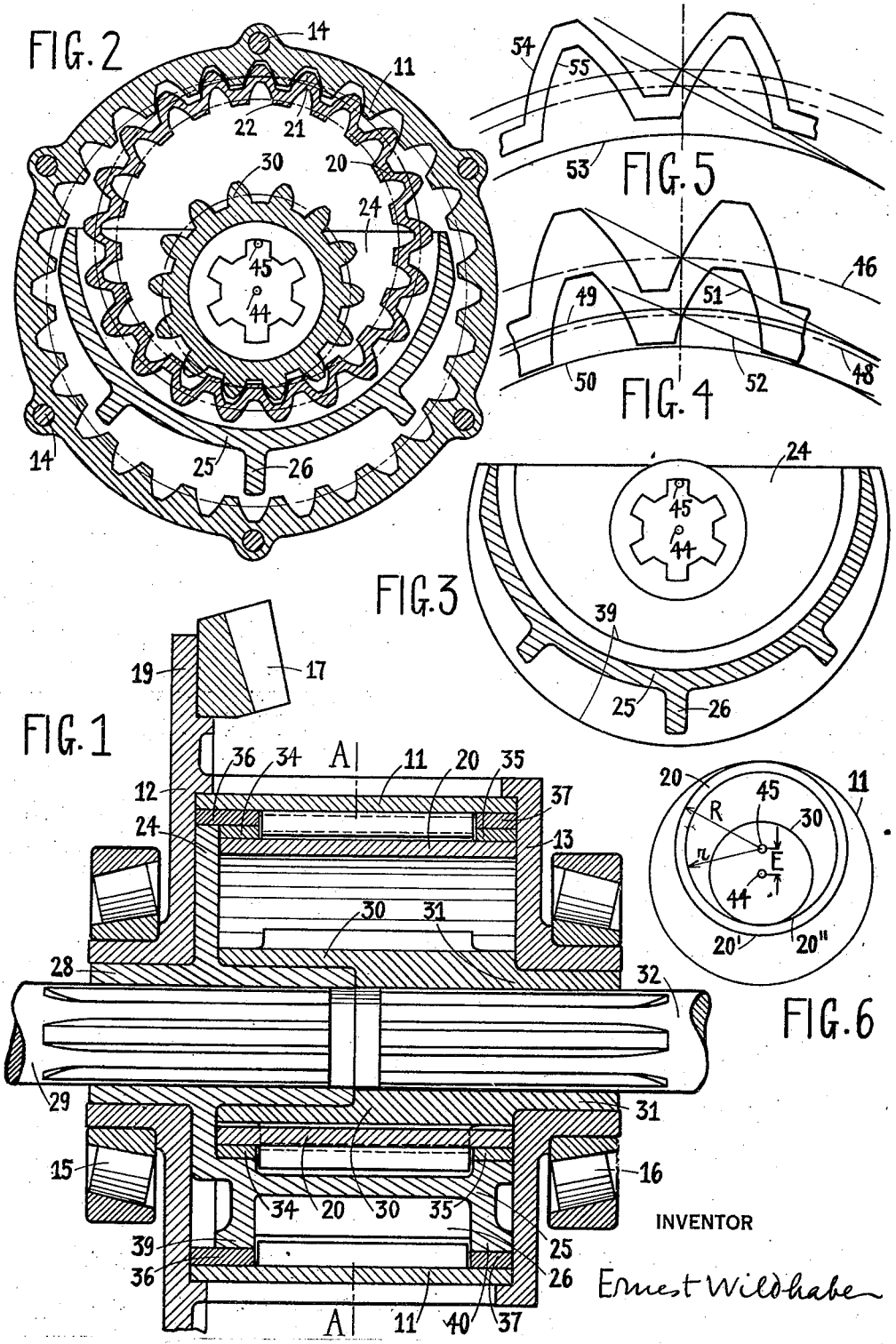
INVENTOR
Ernest Wildhaber Patented Oct. 1, 1929

1,730,183

UNITED STATES PATENT OFFICE

ERNEST WILDHABER, OF BROOKLYN, NEW YORK

DIFFERENTIAL GEAR

Application filed February 7, 1928. Serial No. 252,497.

The present invention refers to differential gears, and particularly to such differential gears as are used in automotive vehicles, namely automobiles, trucks and tractors. Differential gears of this character serve to apply torque from a single source of power to a plurality of wheels of a vehicle, especially for applying torque from a single motor to the wheels of a rear axle.

A differential gear of the character referred to contains a driving member and two coaxial driven members. The driving member receives power from a motor, and applies torque to the two driven members in such manner that said driven members may yet turn relatively to one another and adapt themselves to the path of the vehicle. This added degree of freedom is typical for differential gears, and sets them apart from mere planetary transmissions or other gearing. In differential gears the position of the driving member does not yet determine the position of each driven member. The position of a driving member also depends upon the position of the other driven member. In planetary transmissions and in other gearing, however, the position of every member is determined, when the position of the driving member is known, and kinematically there is only one driving member and one driven member.

One object of my invention is to provide a very simple differential gear for automotive vehicles. A further object is to provide a novel spur gear differential suited to transmit equal torque to the two driven members of the differential. A still further purpose is to provide a differential gear furnishing a greater amount of elasticity in the transmission of power.

Other objects will be apparent in the course of the specification and from recital of the appended claims.

An embodiment of my invention is illustrated in the accompanying drawing, in which Fig. 1 is an axial section of a differential gear constructed in accordance with my invention.

Fig. 2 is a section along lines A—A of Fig. 1.

Fig. 3 is a separate view and section along lines A—A of the planet carrier of the illustrated embodiment.

Fig. 4 and Fig. 5 are enlarged partial views of the teeth of a planetary member such as may be used, one or the other in a differential gear as indicated in Fig. 1 and Fig. 2.

Fig. 6 is a gear diagram, showing in a reduced scale the pitch circles of the individual gears of the illustrated embodiment of my invention.

In the drawing, the numeral 11 denotes an internal orbit gear (see Fig. 1 and Fig. 2), which forms part of the driving member of the differential gear. Orbit gear 11 and two side members 12, 13 are rigidly secured together by bolts 14, and constitute a casing, which is journalled in conventional manner on the bearings 15, 16. The bearings are diagrammatically shown as tapered roller bearings, but may be also of any suitable other kind. The casing, of which gear 11 forms a part, receives power from a motor, through a pinion meshing with bevel gear 17 in known manner, the pinion being not shown in the drawing. Bevel gear 17 is rigidly secured to extension 19 of side member 12.

Orbit gear 11 meshes with a planetary member 20 (see Fig. 2) which is provided with external gear teeth 21, and with internal gear teeth 22, and which is therefore at the same time an external gear and an internal gear. Planetary member 20 is mounted on a planet carrier 24 in a novel manner to be described hereafter. In Fig. 2 and Fig. 3 the planet carrier is shown in section outside of its bearing area, and is seen to be an arm 25 of half moon form, which is suitably reinforced by ribs 26. Arm 25 extends on the side opposite to the center of the planetary member 20, and serves as a counterweight to said member. Planet carrier 24 contains a hub 28, with which engages a splined shaft 29, which may drive one wheel of a rear axle. An external sun gear 30 contains a hub 31, to which fits splined shaft 32, which may drive the other wheel of said rear axle. Planet carrier 24 and sun gear 30 are therefore or form part of the two driven members of the differential gear. Sun gear 30 meshes with the intenal teeth 22 of the planetary member 20, and orbit gear 11 meshes with the external teeth 21 of said planetary member. Orbit gear 11 and sun gear 30 are therefore geared together through the planetary member 20. The gear ratio between the two is usually made two to one, as will be further explained hereafter.

The way of mounting the planetary member 20 on the planet carrier will now be explained. Rings 34, 35 are secured on the ends to planetary member 20, the outside surfaces of said rings coinciding preferably with the cylindrical pitch surface of the external planetary gear. Internal orbit gear 11 is similarly provided with rings 36, 37, whose inner side coincides with the cylindrical pitch surface of gear 11. The planet carrier 24 contains two parts 39, 40 of half moon form, which on their inner side bear against the rings 34, 35 of the planetary member, and with their outer side against the rings 36, 37 of internal orbit gear 11. Inasmuch as the planet carrier does not hold the planetary member on its whole circumference, but only on part of it, means are provided for further holding the planetary member in place. These means consist in the aforesaid rings 34, 35 of the planetary gear and of the rings 36, 37 of the internal orbit gear, which contact with each other at the line of contact of the cylindrical pitch surfaces, and which during gear mesh roll upon each other. The planetary member 20 is therefore mounted with sufficient rigidity and in a positive manner.

In operation, the individual gears of the differential are ordinarily at rest with respect to one another, and the differential gear turns around as a solid unit, like in the conventional types of automotive differential gears. Only occasionally, namely when a car turns, do the individual gears move.

In almost all cases it is desirable that an equal amount of torque is transmitted to the two driven members of the differential gear, namely to the planet carrier 24 and to sun gear 30. This aim is attained, when the gear reduction between orbit gear 11 and sun gear 30 is two to one, that is to say when the sun gear 30 will turn twice per revolution of the orbit gear 11, imagining that the axis of the planetary member is maintained stationary. In this case namely half of the total torque exerted on orbit gear 11 is applied in the same direction to sun gear 30, so that the remaining half necessarily constitutes the torque (relatively to the center of the differential gear) applied to the planet carrier. Planet carrier and sun gear form part of the two driven members respectively, and inasmuch as, according to the above, they receive each one half of the total torque, they receive an equal amount of torque.

This reasoning holds true broadly for any form of differential gear of the general type, where the planet carrier forms part of one of the two driven members of a differential which ordinarily turns around as a solid unit, with the individual gears relatively at rest. In order to transmit equal torque to the two driven members, it is only necessary to provide a ratio, ordinarily a gear ratio, of two to one between the driving member and one of the driven members. Said ratio is to be effected through a planetary member, in such a manner that said two members would turn in the same direction of revolution, when the planetary member is imagined to turn on a stationary center. Just how said ratio of two to one is obtained is unessential, whether with an internal and external gear, whether with bevel gears of different pitch cone angles, or whether with any other imaginable means, as long as the friction losses of said means do not assume excessive proportions. Even excessive friction losses could however not modify the general principle, but only affect to a certain extent the above said ratio of two to one.

The diameters of the pitch circles of the gears, see Fig. 6, may be determined with known methods from the above said ratio.

For further demonstration of the transmission of torque from the driving member equally to the two driven members of a differential gear, the determination of the pitch diameters will be derived below directly from the above said desired equal distribution of torque.

In Fig. 6, the numeral 44 denotes the center of the differential gear, which is also the center of internal orbit gear 11 and of external sun gear 30. The center of the planetary member (20) is marked as 45. Let E be the eccentricity or offset of the center 45 of the planetary member from the center 44 of the differential gear. Let further R be the pitch radius of the external planetary gear, and $r$ be the pitch radius of the internal planetary gear. P denotes the tangential component of the tooth load, as applied to the contacting pitch circles of orbit gear 11 and external planetary gear 20'. The tangential component P' of the tooth load as applied to the contacting pitch circles of internal planetary gear 20'' and external sun gear 30 causes an equal and opposite torque on the planetary member as tooth load P. Said torque of load P′ is $P' \times r$; while the torque of load P is $P \times R$. These torques being equal, load P′ can be expressed as follows:

$$P' = P\frac{R}{r}.$$

The total torque exerted through internal orbit gear 11 equals load P multiplied with the radius $(R+E)$ of said gear, that is $P \times (R+E)$. The torque exerted on sun gear 30 equals P′ multiplied with radius $(r-E)$, that is $$P' \times (r-E) = P\frac{R}{r}(r-E).$$

The torque exerted on the planet carrier equals the reaction of the bearing multiplied with the offset E of center 45 of said bearing from the center 44 of the differential gear. Said reaction or rather the tangential component of said reaction equals the sum of the loads P and P′ which are exerted upon the planetary member, that is to say $$(P+P') = P\left(1+\frac{R}{r}\right).$$

The torque exerted on the planet carrier is therefore $$P\left(1+\frac{R}{r}\right) \times E.$$

The torques exerted on sun gear 30 and on the planet carrier respectively should be equal and inasmuch as they are exerted in the same direction of revolution, each should be one half of the total torque exerted through internal orbit gear 11. One of these relations is sufficient for determining the interrelation of the eccentricity E and the radii R, r. We will use the relation, that the torque exerted on sun gear 30 equals one half of the total torque, that is $$P\frac{R}{r}(r-E) = \frac{1}{2}P(R+E),$$

and then prove in the end that this also means that the torques applied to the two driven members are equal. The above equation can be transformed as follows:

$$2R - 2\frac{R}{r}E = R + E;$$

$$E\left(1+2\frac{R}{r}\right) = R;$$

$$E = \frac{R}{\left(1+2\frac{R}{r}\right)}.$$

This formula serves to determine the eccentricity E from known radii R and r.

When introducing the above value for E in the expression giving the torque exerted on sun gear 30, the following transformation may be made:

$$\text{Torque} = P\frac{R}{r}(r-E) = PE\left(\frac{R}{E}-\frac{R}{r}\right) = PE\left(1+2\frac{R}{r}-\frac{R}{r}\right) = PE\left(1+\frac{R}{r}\right).$$

This expression is the same as the one above, which furnishes the torque exerted on the planet carrier. It is thus again proven, that an equal amount of torque is transmitted to the two driven members of the differential gear.

Preferably the difference between the pitch radius R of the external planetary gear and the pitch radius r of the internal planetary gear is kept a minimum. The smaller the difference $(R-r)$, the nearer tooth load P′ will come to tooth load P, and the more uniform are the stresses of the whole differential gear. This object may be accomplished by providing an equal number of external and of internal teeth on the planetary member 20, and by so disposing said teeth, that the spaces intermediate the internal teeth reach into the external teeth of the planetary member, see Figures 4 and 5. One may go as far as indicated in said figures, in which the spaces intermediate the internal teeth reach beyond the root circle of the external teeth. The root circle is, as known, the circle on which the tooth bottoms are located. Fig. 4 is an enlarged partial view corresponding to Fig. 2. The pitch circles 46, 48 are shown in dash and dot lines. The teeth indicated are of involute form, having different base circles 49, 50, and being suited to mesh along lines of action 51, 52.

Fig. 5 illustrates a case where the thickness of the planetary member, between the surfaces of the external and internal teeth is still smaller, and where the external and the internal gear contain the same base circle 53. In consequence the said thickness is constant along the height of the teeth, because the involutes 54, 55, having a common base circle, are equidistant curves.

A glance at Fig. 2 and at the detail Figures 4 and 5 indicates, that there is more elasticity and yielding capacity in the shown type of differential gear than in other known types.

This feature gives a very smooth operation, when not exaggerated. Smooth operation is also favored by the use of internal gears, in which the teeth enter contact comparatively slowly, as is well known.

A number of modifications may be made in my invention, without departing from its spirit. For definition of the scope it is relied upon the annexed claims.

What I claim and desire to secure by Letters Patent is:

1. A differential gear containing a driving member and two coaxial driven members, a planet carrier constituting one of said driven members, a planetary member disposed parallel to the axis of said carrier and rotatably secured to said carrier, said planetary member being provided externally and internally with equal numbers of teeth, the external teeth and the tooth spaces between the internal teeth having equal angular position, an internal orbit gear and an external sun gear constituting respectively the driving member and the other of said driven members, said internal gear meshing with the external teeth of the planetary member and said external sun gear meshing with the internal teeth of the planetary member.

2. A differential gear containing a driving member and two coaxial driven members, a planet carrier constituting one of said driven members, a planetary member disposed parallel to the axis of said carrier and rotatably secured to said carrier, said planetary member being provided with teeth forming an external gear and an internal gear, an internal orbit gear and an external sun gear constituting respectively the driving member and the other of said driven members, said internal gear meshing with the teeth of the external planetary gear and said external gear meshing with said teeth of said internal planetary gear, a projection of crescent form rigidly connected with said planet carrier and extending between said planetary member and the internal orbit gear, said projection being suited to hold said planetary member on part of its circumference, and additional means for rotatably holding said planetary member on another part of its circumference, said additional means being angularly movable relatively to said planet carrier.

3. In a differential gear containing a driving member and two coaxial driven members, an internal orbit gear forming part of the driving member, a planet carrier constituting one of said driven members, a planetary member rotatably held in said planet carrier on part of its circumference, additional means for rotatably holding said planetary member on another part of its circumference, said additional means being angularly movable relatively to said planet carrier, and means operatively connecting the driving member through said planetary member with the other of said driven members.

4. In a differential gear containing a driving member and two coaxial driven members, a planetary member for transmitting torque from the driving member to said driven members, means for rotatably holding said planetary member on part of its circumference and rolling means for holding said planetary member on another part of the same circumference.

5. In a differential gear containing a driving member and two coaxial driven members, a planetary member for transmitting torque from the driving member to said driven members, said planetary member being provided with equal numbers of external and of internal teeth, said external teeth and the spaces intermediate said internal teeth having substantially equal angular positions, means for rotatably holding said planetary member on part of its circumference, means embodying the pitch circle of said external teeth, and a race way concentric with the differential gear and contacting with said pitch circle embodying means.

6. In a differential gear containing a driving member and two coaxial driven members, a driving member having a race way concentric with the axis of the differential gear, a planetary member for transmitting torque from the driving member to said two driven members, said planetary member being suited to contact with and to roll on said race way, and means for rotatably holding said planetary member on part of its circumference only, said part being opposite to said contact.

7. In a differential gear containing three coaxial members, namely a driving member and two driven members, a planetary member rotatably held on part of its circumference by one of said coaxial members and contacting continuously with a second of said coaxial members on another part of its circumference, said parts of the circumference having a constant relation to each other, and means for operatively connecting said planetary member with said second member and with the third of the three coaxial members.

8. In a differential gear containing three coaxial members, namely a driving member and two driven members, a planetary gear rotatably held by one of said coaxial members, means for operatively connecting said planetary gear with the two other of said coaxial members, a rolling surface embodying a pitch circle of said planetary gear, and a mating rolling surface disposed on one of said two other coaxial members.

9. In a differential gear, three coaxial members, namely a driving member and two driven members, one of said coaxial members being a planet carrier, a planetary member, said planetary member containing an equal number of external and internal teeth of equal axial position, the spaces intermediate said teeth extending across the whole width of face of said planetary member, and gears forming part of the other two of said three coaxial members and meshing with said planetary member.

10. In a differential gear containing three coaxial members, namely a driving member and two driven members, a gear having external teeth and an equal number of internal spaces following said external teeth in a manner to effect a constant thickness of said gear between the sides of the external teeth and the sides of said spaces, and other gears meshing with the first said gear, for operatively interconnecting said three coaxial members.

11. In a differential gear containing three coaxial members, namely a driving member and two driven members, a gear containing external teeth and an equal number of internal teeth, the tooth spaces intermediate said internal teeth reaching into the external teeth beyond the root circle of said external teeth, and other gears meshing with the first said gear, for operatively interconnecting said three coaxial members.

ERNEST WILDHABER.